(12) United States Patent
Prokschi et al.

(10) Patent No.: US 8,316,906 B2
(45) Date of Patent: Nov. 27, 2012

(54) IMPREGNATION OF A FILAMENT ROVING

(75) Inventors: Hermann Prokschi, Wartberg ob der Aist (AT); Siegfried Westmüller, Alkoven (AT)

(73) Assignee: Borealis Technology Oy, Porvoo (FI)

( * ) Notice: Subject to any disclaimer, the term of this patent is extended or adjusted under 35 U.S.C. 154(b) by 113 days.

(21) Appl. No.: 12/735,007

(22) PCT Filed: Dec. 2, 2008

(86) PCT No.: PCT/EP2008/066625
§ 371 (c)(1),
(2), (4) Date: Jun. 9, 2010

(87) PCT Pub. No.: WO2009/074490
PCT Pub. Date: Jun. 18, 2009

(65) Prior Publication Data
US 2010/0263785 A1    Oct. 21, 2010

(30) Foreign Application Priority Data
Dec. 12, 2007   (EP) .................................... 07123015

(51) Int. Cl.
*B29B 15/14*  (2006.01)
(52) U.S. Cl. ........ 156/441; 156/296; 118/234; 425/224; 427/428.06
(58) Field of Classification Search .................. 264/136, 264/137; 427/428.06, 428.18, 428.19; 401/11, 401/35, 197; 118/78, 216, 220, 221, 225, 118/234, 305, 307, 420; 28/246; 57/7, 292, 57/295; 184/17; 156/433, 441; 425/224; B29B 15/14
See application file for complete search history.

(56) References Cited

U.S. PATENT DOCUMENTS

| | | | | |
|---|---|---|---|---|
| 3,028,833 | A | * | 4/1962 | Hummel ........................ 118/692 |
| 3,401,542 | A | * | 9/1968 | Evans ............................. 68/202 |
| 3,422,796 | A | | 1/1969 | Baber |
| 4,059,068 | A | | 11/1977 | Guillermin et al. |
| 5,073,413 | A | * | 12/1991 | Koppernaes et al. ......... 427/356 |
| 5,490,879 | A | * | 2/1996 | Corradi et al. ................ 118/212 |
| 5,798,068 | A | | 8/1998 | Vlug |
| 6,086,239 | A | | 7/2000 | Jarvenkyla et al. |
| 6,814,807 | B1 | * | 11/2004 | Carr et al. ...................... 118/420 |
| 6,843,853 | B2 | * | 1/2005 | Miskech et al. ............... 118/264 |
| 2002/0076254 | A1 | * | 6/2002 | Calabro et al. ................. 401/23 |
| 2005/0221085 | A1 | | 10/2005 | Lo et al. |
| 2008/0196660 | A1 | * | 8/2008 | Uozumi et al. ............... 118/234 |

FOREIGN PATENT DOCUMENTS

| | | | | |
|---|---|---|---|---|
| CH | 595888 | A | * | 2/1978 |
| EP | 0 397 506 | A | | 11/1990 |
| JP | 01231969 | A | * | 9/1989 |

* cited by examiner

Primary Examiner — William Bell
(74) Attorney, Agent, or Firm — Warn Partners, P.C.

(57) ABSTRACT

The invention relates to a device and a method for impregnating filaments, wherein the filaments form a roving. The device comprises a barrel (10) having at least one groove (12) formed in circumferential direction of the barrel, an inner space formed along the center axis of the barrel, and at least one recess (16) which forms a connection between the inner space and the groove. The recess includes a cylindrical section (16*a*), a conical section (16*b*) and a pocket section (16*c*). By means of said device and according to the method, a polymer material can be pressed successively from the inner space through at least the cylindrical section and the conical section into the groove to impregnate the filaments of the roving which is drawn through the groove.

20 Claims, 13 Drawing Sheets

IMPREGNATION OF A FILAMENT ROVING

This application is a National Stage of International Application No. PCT/EP2008/066625, filed Dec. 2, 2008. This application claims priority to European Patent Application No. 07123015.5 filed on Dec. 12, 2007. The disclosures of the above applications are incorporated herein by reference.

This invention relates to a method and a device for impregnating filaments in a roving.

Generally, the present invention relates to a method and a device for manufacturing a fibre-reinforced material. Specifically the present invention relates to a method and a device for manufacturing fibre-reinforced material, which is formed by a reinforcing fibre bundle or bundles bonded with a matrix forming resin material in such a way that also the individual fibres are surrounded by resin material.

TECHNOLOGICAL BACKGROUND

The main problem in the manufacture of products of this kind is the high viscosity of some matrix forming materials. Because the individual fibres in the fibre bundles are very tightly near each other, it is thereby difficult for the resin material to penetrate into the bundle to surround all individual fibres. However, this would be necessary in view of the properties of the product, such as strength, stiffness, chemical resistance etc.

Many methods have been tried for the solution of the problem. In one solution fibre bundles are transferred through a so-called cross-head die, in which molten or liquid resin is penetrated into the fibre bundles moving through the die. In the so-called powder method a web of fibre bundles is transferred through a bed of thermoplastic resin particles, whereby the web of fibre bundles carries along resin particles, which at a later stage are melted. There are also solvent methods in which fibre bundles are impregnated with resins dissolved in liquid medium.

The cross-head die method has proved to be ineffective in the impregnation of fibre bundles with thermoplastic resin because all individual fibres will not be surrounded by resin material. Powder methods have proven to involve a multiple of processing stages which are difficult to synchronize, are expensive to purchase and operate while damaging the reinforcement. In solvent methods a drying process is required, which is expensive, causes environmental problems, is time-consuming and limits the production rate. Furthermore the quality of the product is low due to voids left after the removal of solvents.

For example, EP 0397 506 A2 discloses such method and apparatus for manufacturing fibre-reinforced material.

An object of the invention is to provide a method and apparatus for impregnating filaments in a roving, wherein the single filaments of a bundle are reliably impregnated before forming a single strand.

This object is solved by the subject matter of the respective independent claims. Further exemplary embodiments are described in the respective dependent claims.

According to an exemplary embodiment, a device for impregnating filaments, wherein the filaments form a roving, comprises a barrel having at least one groove formed in circumferential direction of the barrel, an inner space formed along the centre axis of the barrel, and at least one recess which forms a connection between the inner space and the groove. The recess includes a cylindrical section, a conical section and a pocket section. At such a device, a polymer material can be pressed successively from the inner space through at least the cylindrical section and the conical section into the groove to impregnate the filaments of the roving which is drawn through the groove.

The pocket section of the recess of the device might extend at the bottom surface of the groove from the conical section of the recess in circumferential direction of the barrel of the device. Additionally, the pocket section might be formed as a tear drop or as an imprint of a prow of a flat boat. In this configuration, the polymer material will flow from the cylindrical section into the conical section and, then, from the conical section directly into the groove as well as into the pocket section and subsequently into the groove. The polymer material will, thus, be pressed from the conical section and the pocket section of the recess, mainly in the central portion of the roving from one side into the roving and through the filaments of said roving.

The barrel of the device according to a preferred embodiment of the invention comprises a row of twelve grooves or of twenty-eight grooves, side by side along the axis of the barrel.

The inner space of the barrel of the device might be connected with an extruder pre-processing the polymer used to impregnate the filaments of the roving.

The device might further comprise a comb to lead the roving into the at least one groove.

The device might further comprise several pins to splice the roving before the roving is led into one groove.

The device might further comprise a pressing bar to press each roving onto the bottom surface of a groove, wherein the ribs, formed between two respective grooves, are discontinuous to allow the use of a continuous pressing bar.

The device might further comprise a polygon which is located parallel to the barrel, wherein each roving is drawn above said polygon to improve the impregnation of the filaments of each roving. The polygon might be an octagon.

According to an exemplary embodiment, a method for impregnating filaments, wherein the filaments form a roving, comprises the steps of pre-processing of at least one roving consisting of filaments, leading the at least one roving through a groove formed at a barrel of an above mentioned device, pre-processing a polymer material in an extruder, feeding the pre-processed polymer material into the barrel of the device, and pressing the polymer material through an at least one recess of the device into the groove of the device, and into the at least one roving to impregnate the filaments of said roving.

The pre-processing includes at least one of the steps of splicing the at least one roving by means of several splicing pins, of leading the at least one roving into the groove by means of a comb, and of heating the at least one roving.

The method might further comprise the step of pressing the roving onto the bottom surface of the groove, by means of a pressing bar.

The method might further comprise the step of drawing the roving soaked with polymer material, over a polygon.

These and other aspects of the invention will be apparent from and elucidated with reference to the embodiment described hereinafter.

In the following, the invention will be described by means of exemplary embodiments with regard to the attached figures.

With respect to FIG. 1, the method of impregnating filaments in a roving will be described in the context of the method to produce a granulate formed from a strand of impregnated filaments.

Figure 1:
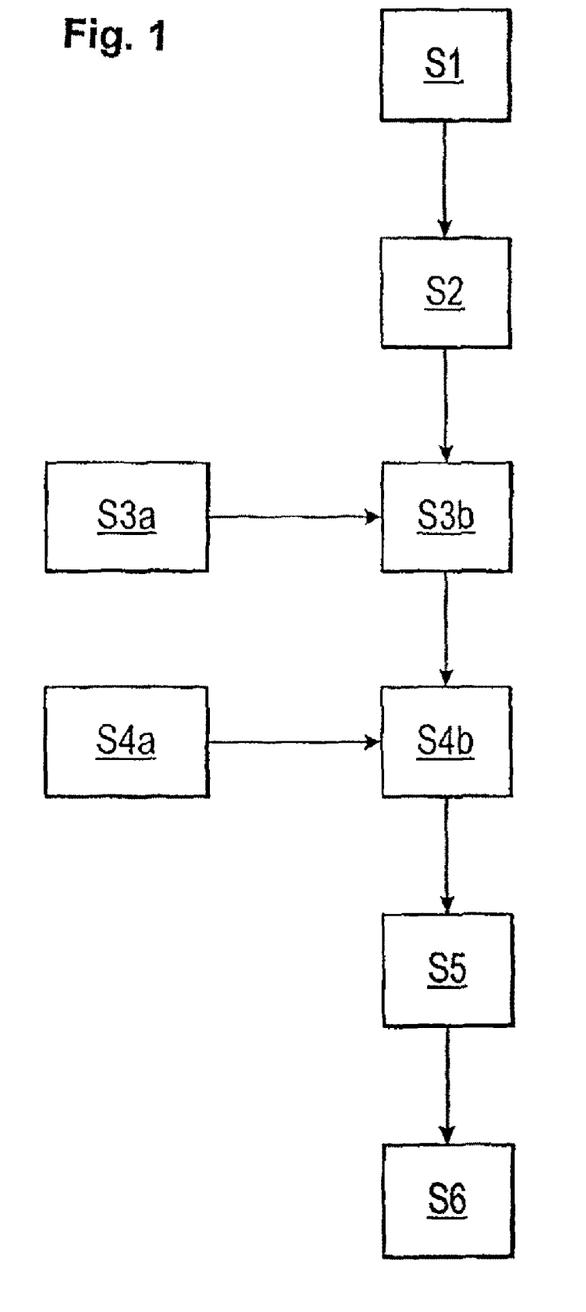
FIG. 1 is a schematic diagram illustrating the steps of the method according to the invention.

Step S1 in FIG. 1 concerns the situating of fibres to form a roving. Therefore, from some spools fibre material is winded up. In an exemplary embodiment, fibre material will be winded up from three spools. The said fibre material forms rovings which should be spliced together to ensure a continuous, uninterrupted feed to the production line, usually three rovings per strand.

A length of roving (approx. 50 cm) is rolled out from the end of the leading spool along with a similar length of roving drawn from the end of the next successive spool. The two lengths are then formed into two 180 degree loops. These are then chained together and then spliced with the aid of a special pneumatic device that utilizes a compressed air vortices (or swirls) to splice the fibre strands together.

The roving is guided into the machinery with the aid of two guide-rings, centered exactly above the spools. The first is positioned directly above the respective 'feed' spool thus avoiding possible chafing of the fibres and damage to the roving which would have a significant effect at the impregnation stage, the position of the second serves to align the fibres ahead of the strand brake/detection assembly.

Each splice-point is marked with a metallic spray. At the detection of a fault the detector signals the retraction of the melt bath restraining lip from the octagon and the subsequent loss of strand-tension. The detector also signals the activation of the granulate diverter thereby minimizing product overspill.

Step S2 in FIG. 1 concerns to preheating of the rovings. Prior to the preheating oven, a controllable strand brake is positioned in the plant in order to maintain the tension throughout the roving path. The brake control settings are set according to the roving type. In the case of an exemplary plant the settings were 20 Volt and 490 mA.

In the oven, the conditioning of the glass roving is carried out. Heat transfer is achieved by the use of hot air. The oven's particular construction and design affords two independently adjustable temperature profiles provided by two independent chambers. The first chamber for the roving strand maintains a temperature of approx. 135° C. The secondary chamber of the oven maintains a temperature of approx. 150° C. It is anticipated that the preheating of the rovings improves impregnation possibilities. However, production is also possible without using an oven in the cases where, for example, limited space is a consideration.

In step S3 of the method, the rovings will be impregnated. In step S3a, a PP-granulate is pre-processed in an extruder to form a melt which is suitable to impregnate the filaments of each roving. Said melt of PP-material is fed to an impregnation tool. The rovings are impregnated at said impregnation tool in step S3b.

At this, it is important that the filaments of the roving maintains a perfectly straight path as it traverses from the preheating oven to the impregnation tool. V-shaped guide spigots installed onto a tool mounting help to guide the strand. Each spigot can be rotated through 20°, allowing corrections to the guide path when needed. Thus it is ensured that the strand traverses centrally over the impregnation tool, the strand is completely saturated and that the melt loss is reduced.

Fibrillation is achieved via an array of guide-pins. They progressively separate each roving into singular filaments in preparation for the impregnation stage of the process.

Each roving must pass over a single impregnation unit. The individual units should be configured in a row. A tool spacer/separator is required when handling larger amounts of rovings. Exemplary impregnation tool/units will be described later in detail.

Following to the impregnation unit, a polygon or octagon is provided to achieve an improved impregnation. The positioning and the carrying out (execution) of the octagon positioning is essential to ensure a beneficial impregnation of the roving. The heated octagon's surfaces are coated in a delicate, comb-like structure. This structure expands the impregnated roving and thereby ensures effective impregnation of the filaments when immersed in the following melt bath phase. The adjustable melt bath and restraining lip serve to regulate the melt saturation resulting in improved performance in both the impregnation of the roving and the subsequent covering process. Also an exemplary octagon will be described later in detail.

Step S4 in FIG. 1 is the transition of several impregnated rovings to form a single strand. In step S4a a PP-granulate is pre-processed in an extruder to form a melt which is suitable to coat the impregnated rovings. Said melt of PP-material is fed to a coating nozzle. The rovings are converged and coated in said nozzle in step S4b.

It is noted that the impregnation unit and the coating unit (coating nozzle or cross head) should each be fed by separate melt extruders. The glass roving is impregnated in the impregnation unit using only the minimal required amounts of low viscosity PP-types. The singular rovings are then converged to form a single strand to be subsequently coated with other PP-Types in the coating nozzle.

The spacing between the strand coating nozzle and the octagon is set to approx. 200 mm. The forming unit consists of a cylindrical tube (pipe), 10 mm in diameter and approx. 100 mm in length. Independently heated nozzles are positioned at the entry and exit points of the tube. The temperature at each nozzle can be varied through a range of 240-280 degrees Celsius. Each nozzle has an entry diameter of 3.7 mm and an exit diameter of 3.5 mm suitable for a 40% wt long glasfibery enforced pellets. The tube ensures the achieving of an even and effective melt saturation.

The roving guidance, the roving fibrillation as well as the octagon and the melt bath, incorporated in the strand forming assembly, can be adjusted in height and on the lateral axis. Additionally, the coating unit at the convergence stage can be swivelled and is adjustable on 3 axis (x, y, z).

After the strand has been formed, this strand will be cooled in a water bath and, subsequently, dried, in step S5 of the method to produce a granulate. Here, rolls for the leading of the roving in the water bath are being adjustable by degrees in the width. Therefore a fluctuance of the strand is being guaranteed between strand nozzle and outlet.

The waterfilm that coats the produced strand is effectively removed by the use of hair brushes and good airflow.

Drying is recommended before and after the strand take-up assembly stage. The drying pathway spans the end of the water bath to the strand take-up. Some meters "upstream" is required to span the distance between the strand take-up assembly and the granulator.

The strand take-up assembly is primarily used to develop a higher level of traction in the roving, to assist in the regulating of the plant operating speed and for directional guidance to assist the strand feed to the granulator. It can be anticipated that the take-up assembly will be regulated with the aid of a fibre tension measuring device.

In the last step, namely step S6, the strand will be cut into a granulate. Accurate configuration of the strand cutting process is absolutely essential. Imprecise cutter configuration can cause filaments to be ripped-out rather than cut, inevitably resulting in the disruption of production and subsequent insurance of penalties or compensatory claims by the customer. It is noted that the granulator should have enough operating speed in reserve to cope with the eventual increase in production speed.

In the following, an impregnation assembly according to the invention will be described in more detail.

Figure 2:
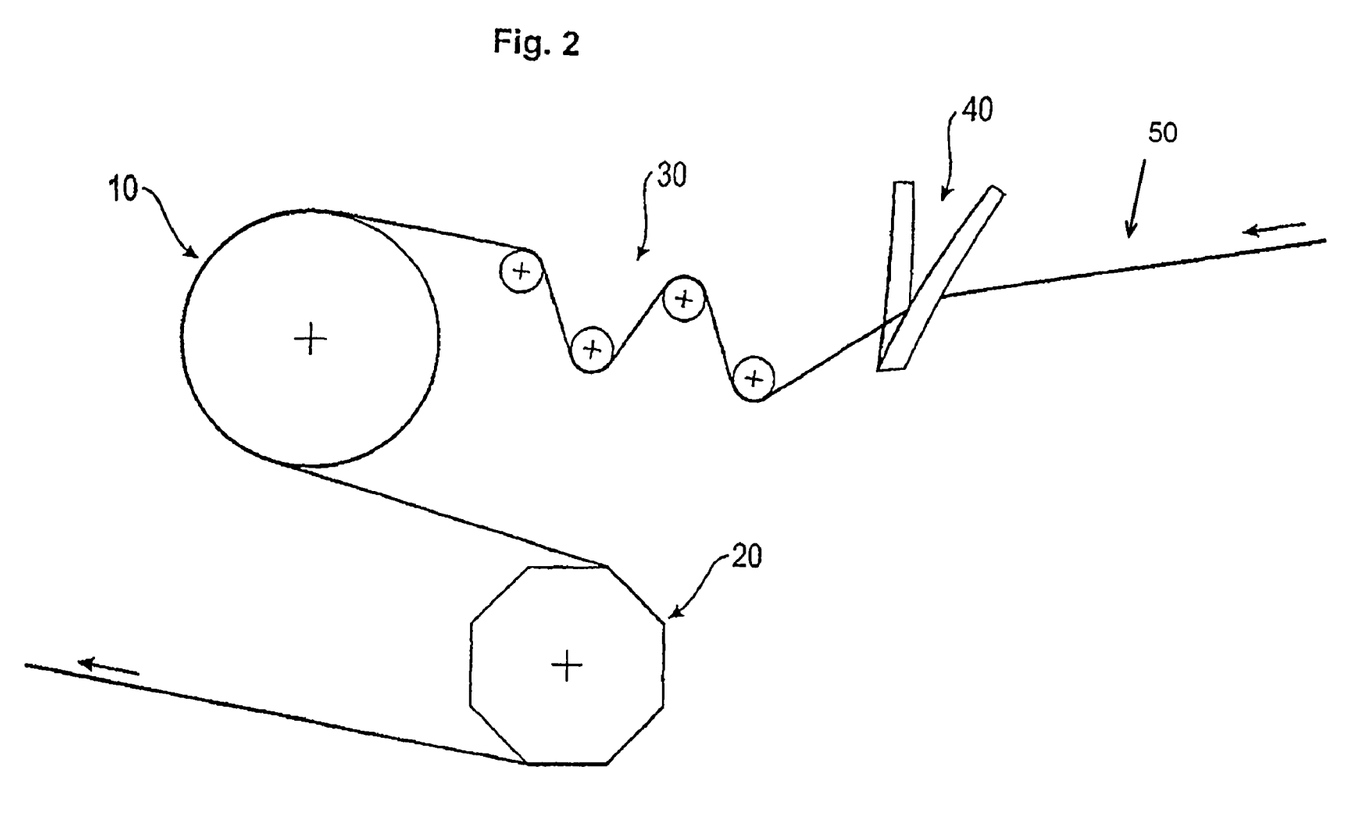
FIG. 2 is a schematic illustration of an apparatus for impregnating filaments.

The individual elements of the impregnation assembly are schematically represented in FIG. 2. The impregnation assembly comprises an impregnation tool 10, a polygon 20, a device for splicing filament bundles 30 and a roving guide 40. As represented in FIG. 2, at first the roving 50 is conducted by the roving guide 40. This guide 40 serves for a uniform distribution of rovings in several bands beside each other. The individual bands of the rovings 50 are then guided by the device 30. The device 30 comprises several pins arranged beside each other and displaced to each other. The roving is moved in snake lines at the guiding the roving 50 through the pins of the device 30. This leading through the pins of the device 30 in snake lines is the reason that the roving 50 is lined up into flat bands. The roving 50 consists of a variety of filaments which will, thus, be ordered essentially besides each other as a band. The roving 50 is led by the device 30 over the impregnation tool 10. The impregnation tool 10 is a barrel which is fixedly mounted. The individual bands of the roving 50 are led besides each other over this barrel. The roving 50 is impregnated by running over said barrel. The exact process of impregnating the filaments of the roving will be explained more exactly with respect to the following figures. The polygon 20 also is firmly positioned relatively to the impregnation tool 10. The roving 50 is removed on the edges of the polygon 20. This way, the polymer material which was, at the impregnation tool 10, brought into the roving 50 is tumbled evenly into the roving 50. Each soaked roving 50 is pulled away from the polygon in a single band. Then, the individual bands of rovings 50 are pulled towards each other and merged together and are covered with another polymer material in a nozzle.

Figure 3:
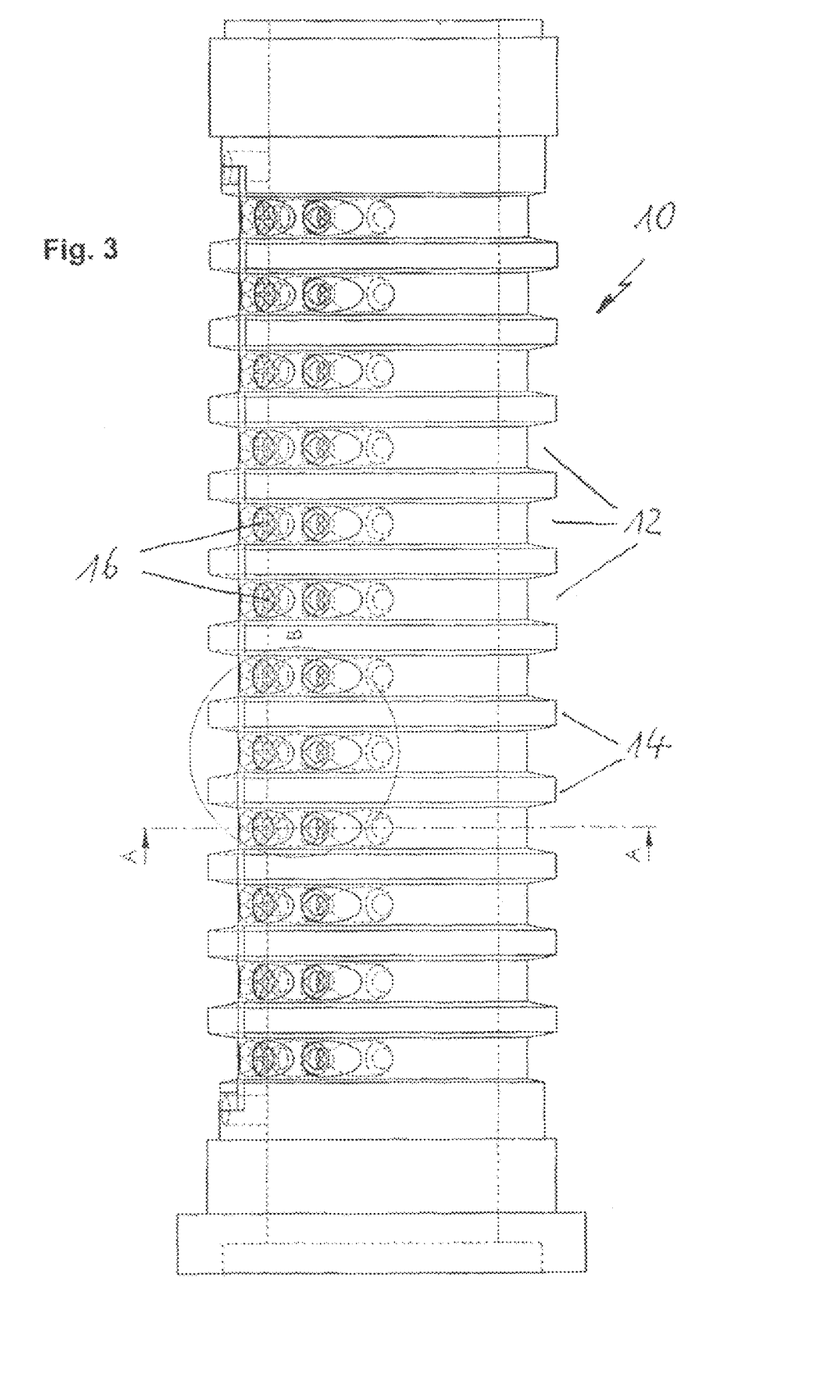
FIG. 3 is a side view of an impregnation tool of an impregnation unit according to a first embodiment of the invention.

FIG. 3 shows an impregnation tool 10 in accordance with a first exemplary embodiment of the invention. The impregnation tool 10 has a barrel which is formed hollowly inside. Furthermore the impregnation tool 10 has several grooves 12 arranged in circumferential direction. Ribs 14 are formed between each of the groove 12. Twelve grooves are formed on the outer size of the impregnation tool 10 according to an preferred embodiment. The flanks of the ribs 14 are tapered. The grooves and the ribs are dimensioned so that they fit to the width of the roving bands. In accordance with an exemplary embodiment the outside diameter of the barrel can be about 60 mm. The grooves are 5 mm deep. Furthermore the barrel is provided with a through hole in axial direction, which is 40 mm in diameter. By means of the through hole in the centre of the barrel polymer material is supplied for impregnating the roving bands.

Several recesses 16 are provided in circumferential direction along each groove 12. The recesses 16 connect the inner space of the barrel with the respective groove 12. This way polymer material can be pressed from the inside of the barrel to the outside and into each of the grooves 12.

In accordance with an exemplary embodiment, six recesses are provided in each of the grooves 12. These recesses are arranged relative to each other in regular distances. The recesses 16 preferably are spaced respectively with 30 degrees to each other along the circumference. The recesses 16 are formed, thus, only on a half of the circumference of the barrel.

Figure 4:
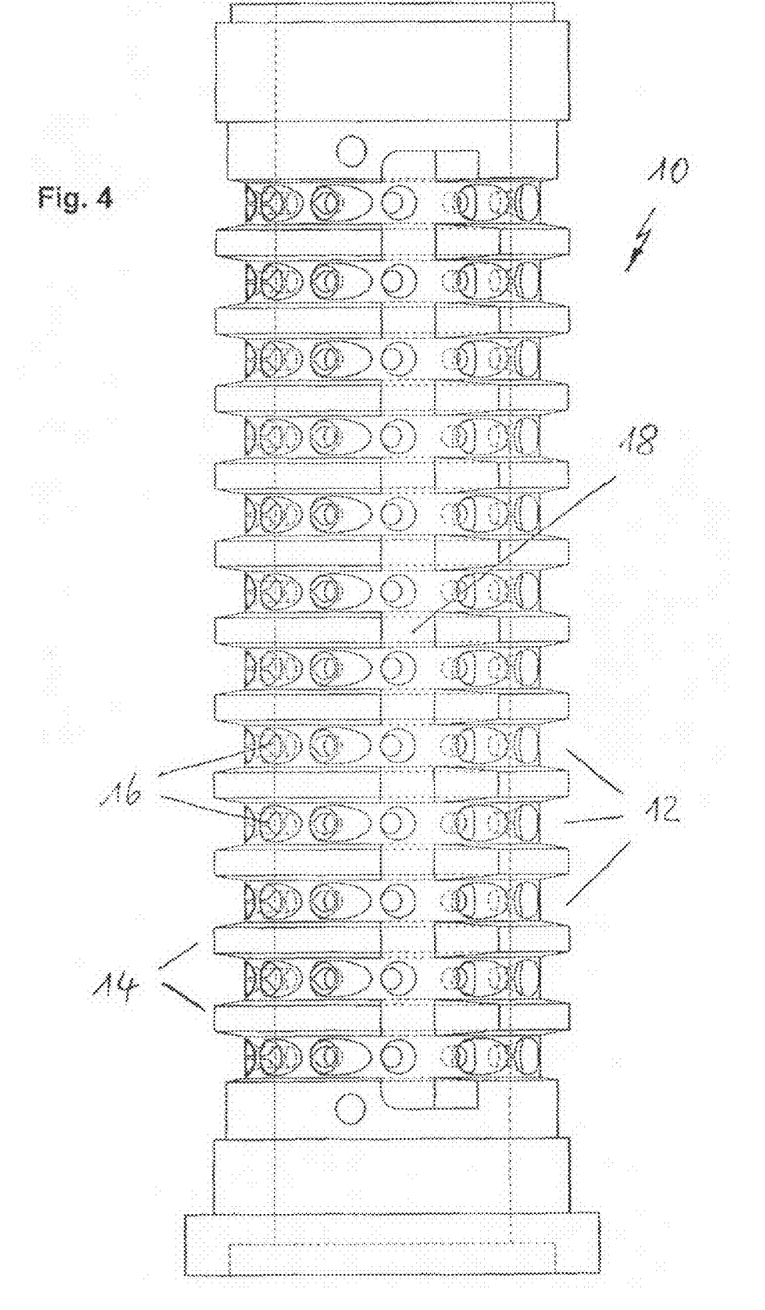
FIG. 4 is a top view of the impregnation tool of FIG. 3.

FIG. 4 shows a top view of the impregnation tool 10 in accordance with the first exemplary embodiment of the invention. The grooves 12 and the ribs 14 can be recognized also in this figure. Also there is shown a pocket 18 which is formed lengthwise in the barrel. The bottom of the pocket 18 is formed flatly. In a preferred embodiment, the depth of the pocket 18 measured from the bottom to the outer circumference of the barrel, is 7 mm. By the pocket 18 the ribs 14 are interrupted. The pocket 18 is provided to be able to push a pressing bar on each band of the rovings 50. Such a pressing bar has the advantage that the individual bands of the roving 50 will be hold flat and pressed.

The pocket 18 is according to a preferred embodiment approximately in the position of the fourth recess 16 in circumferential direction.

Figure 5:
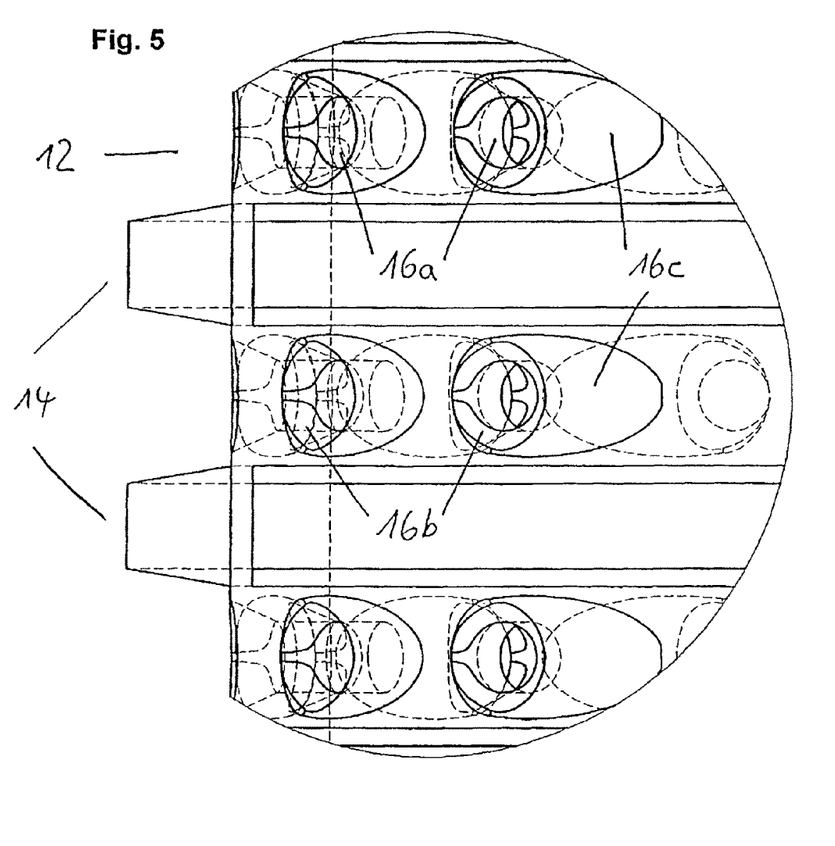
FIG. 5 is a detail view of detail B in FIG. 3.

A detail of FIG. 3 is represented in FIG. 5. Three grooves 12 and two ribs 14 can be seen in this detail. Furthermore several recesses 16 are represented. Said recesses 16 comprise three sections, namely a cylindrical recess section 16a, a conical recess section 16b and a pocket section 16c can particularly be recognized.

Figure 6:
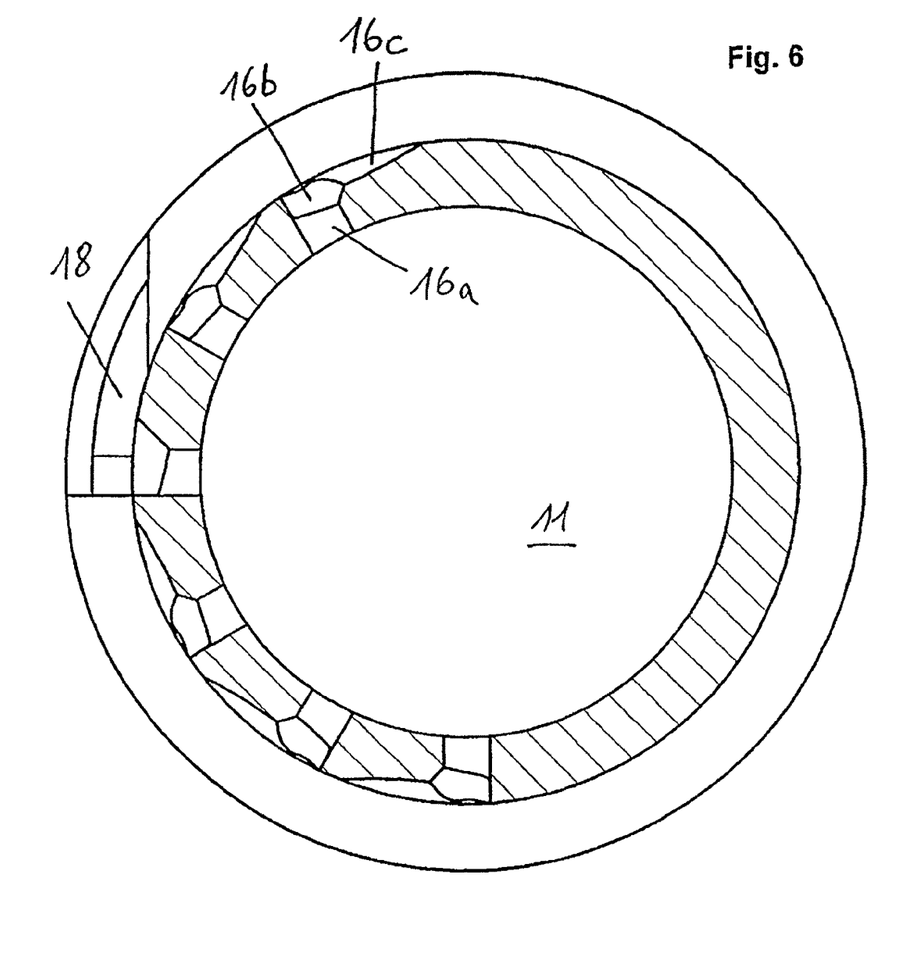
FIG. 6 is a view of the cross section A-A in FIG. 3.

Looking at the detail view of FIG. 5 together with the sectional view of FIG. 6, it can be recognized that the recess 16 is formed with the sections 16a, 16b and 16c from inside to the outside of the barrel. The recess section 16a is cylindrical and provides a first channel for liquid polymer material which shall be pressed from inside to outside of the barrel. The recess section 16b provides a chamfer to the outer surface of the barrel, i.e. of the respective groove. The chamfer of the section 16b makes sure that the polymer material also can extend to the side. The pocket of section 16c is finally formed in circumferential direction of the groove. The pocket section 16c has substantially the form of a tear or a bag to receive melted polymer material.

As soon as a roving band is drawn through a groove and over the recesses 16, liquid polymer material can be pressed from below against the band. The polymer material builds up a pressure from below against the roving band. The band is then moved on in circumferential direction. The melted polymer material is pulled along and is received in the pocket of section 16c. The special sequence of the sections 16a, 16b and 16c is the reason that the melted polymer material which is pressed in from below, does not elude to the side of the roving band but is pressed centrally through it. This way it can be ensured that the individual filaments which form the roving band are enclosed by polymer material. The impregnation tool therefore makes sure that every roving band is impregnated sufficiently and reliably.

Figure 7:
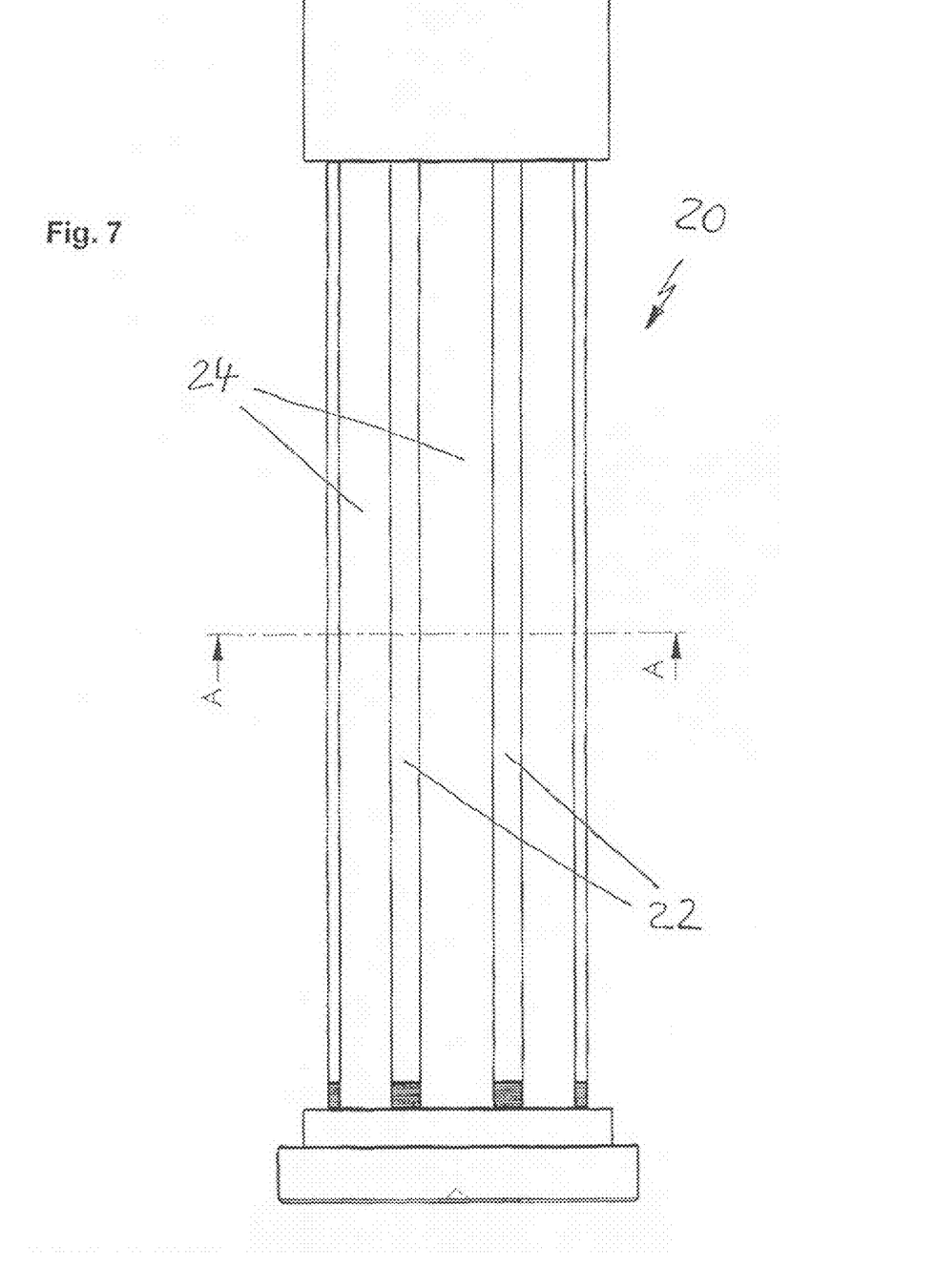
FIG. 7 is a top view of a polygon of the impregnation unit according to the first embodiment of the invention.

A polygon is in FIG. 7 represented. The individual soaked roving bands are drawn about such a polygon following the impregnation tool. It is necessary that the bands are drawn about the polygon in a certain angle. It is desired that the bands are drawn over the edges of the polygon. This way the polymer material which was brought in the impregnation tool into the roving band is additionally worked in into the band.

Figure 8:
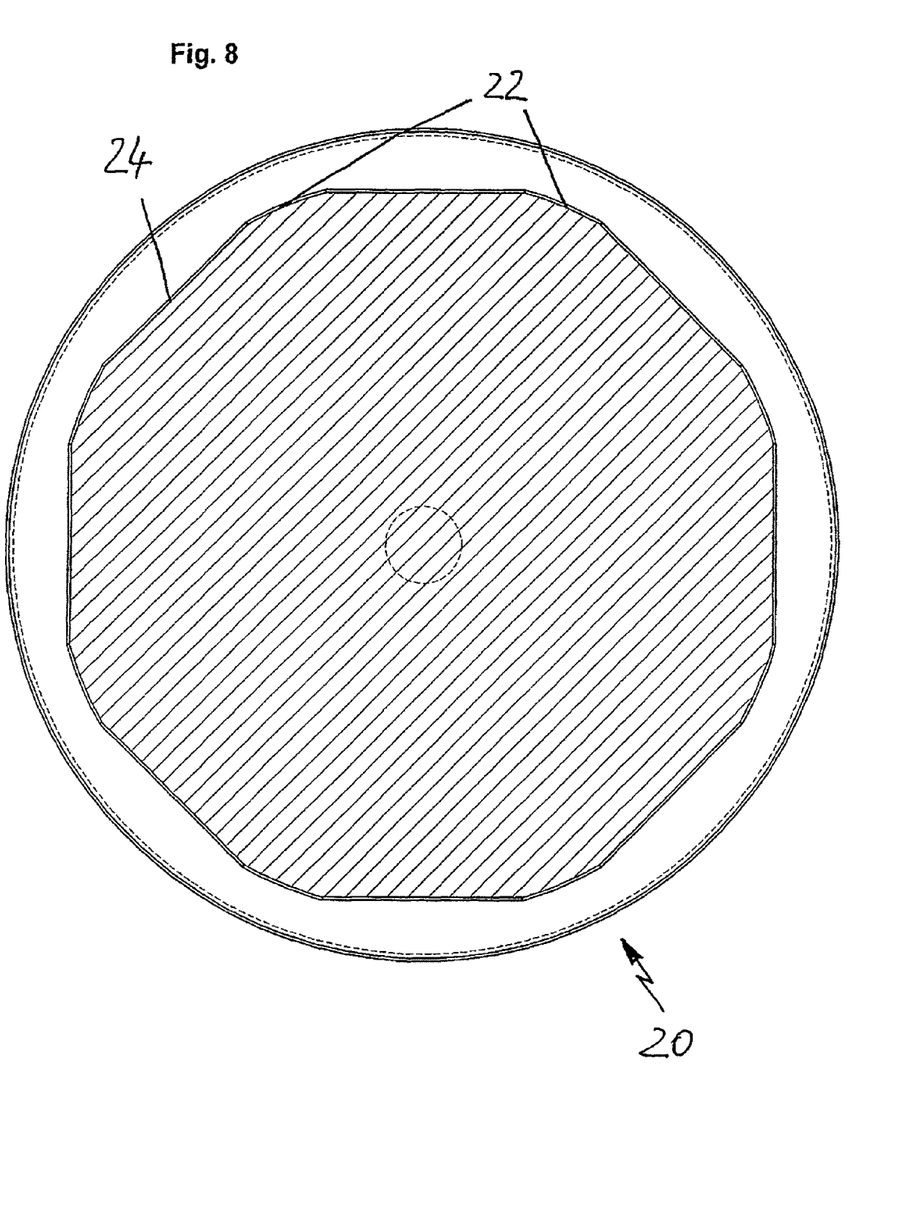
FIG. 8 is a cross sectional view of the polygon of FIG. 7.

A cross-section of the polygon is in FIG. 8 represented. The polygon includes several stripes 22 which serve as edges. Sections 24 leveled, lie between the stripes 22. A soaked band can be pulled over several of the stripes 22 before it is led away from the polygon.

Figure 9:
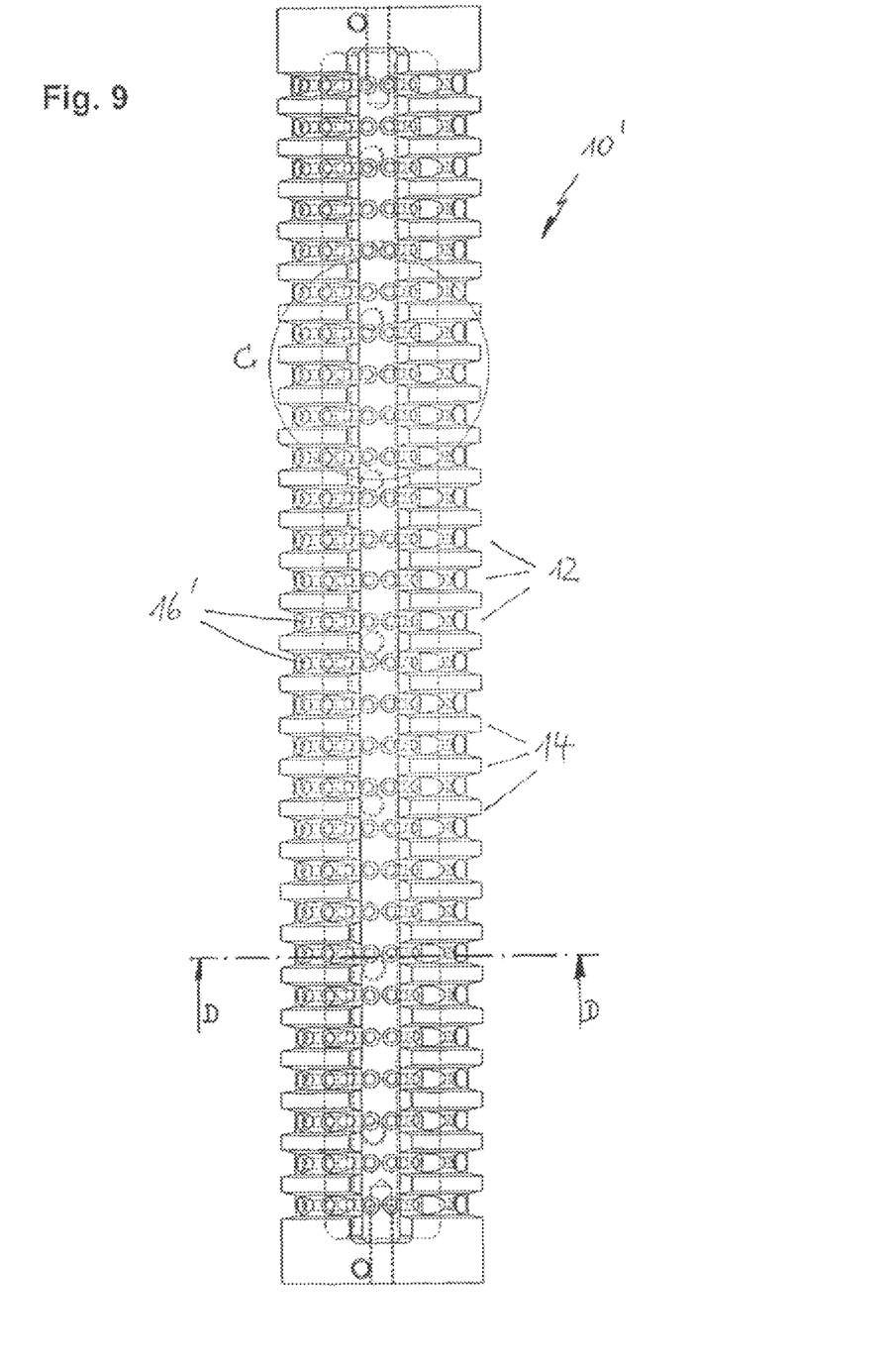
FIG. 9 is a top view of an impregnation tool of an impregnation unit according to a second embodiment of the invention.
Figure 10:
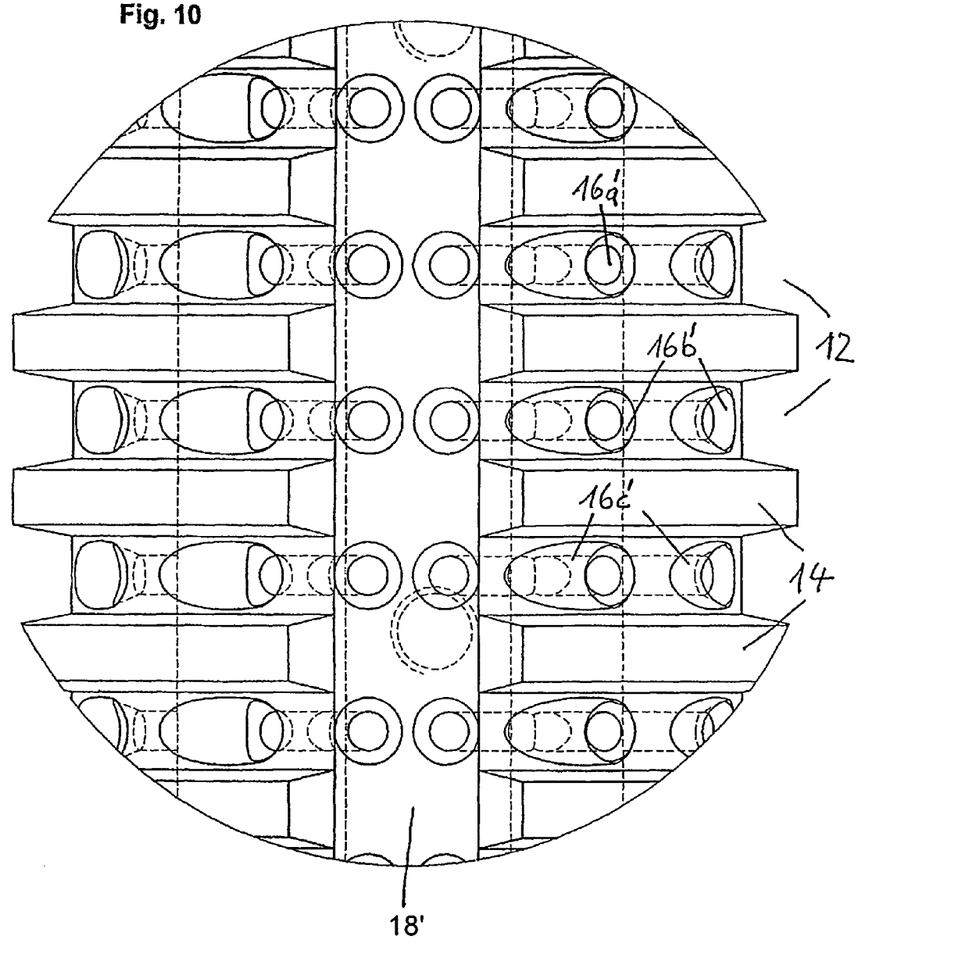
FIG. 10 is a detail view of the detail C in FIG. 9.

An impregnation tool in accordance with a second exemplary embodiment of the invention is represented in FIG. 9. This embodiment is different from the first exemplary embodiment in that it has twenty-eight grooves 12 and respectively ribs 14. Furthermore the impregnation tool 10' formed in accordance with the second exemplary embodiment, is only half of a barrel. The top view in FIG. 9 represents the round top side of the impregnation tool 10'. Several recesses 16' are formed in each groove 12, also at this tool along the circumference. As represented in FIG. 10, the recesses 16 are formed comparably with the recesses 16' of the first exemplary embodiment. The impregnation tool 10' has also a pocket 18' formed in axial direction of the tool. A cut-out which interrupts the ribs 14 forms said pocket 18'. As opposed to the first exemplary embodiment the pocket 18' is located in the position of the third and fourth recesses 16' provided here.

Figure 11:
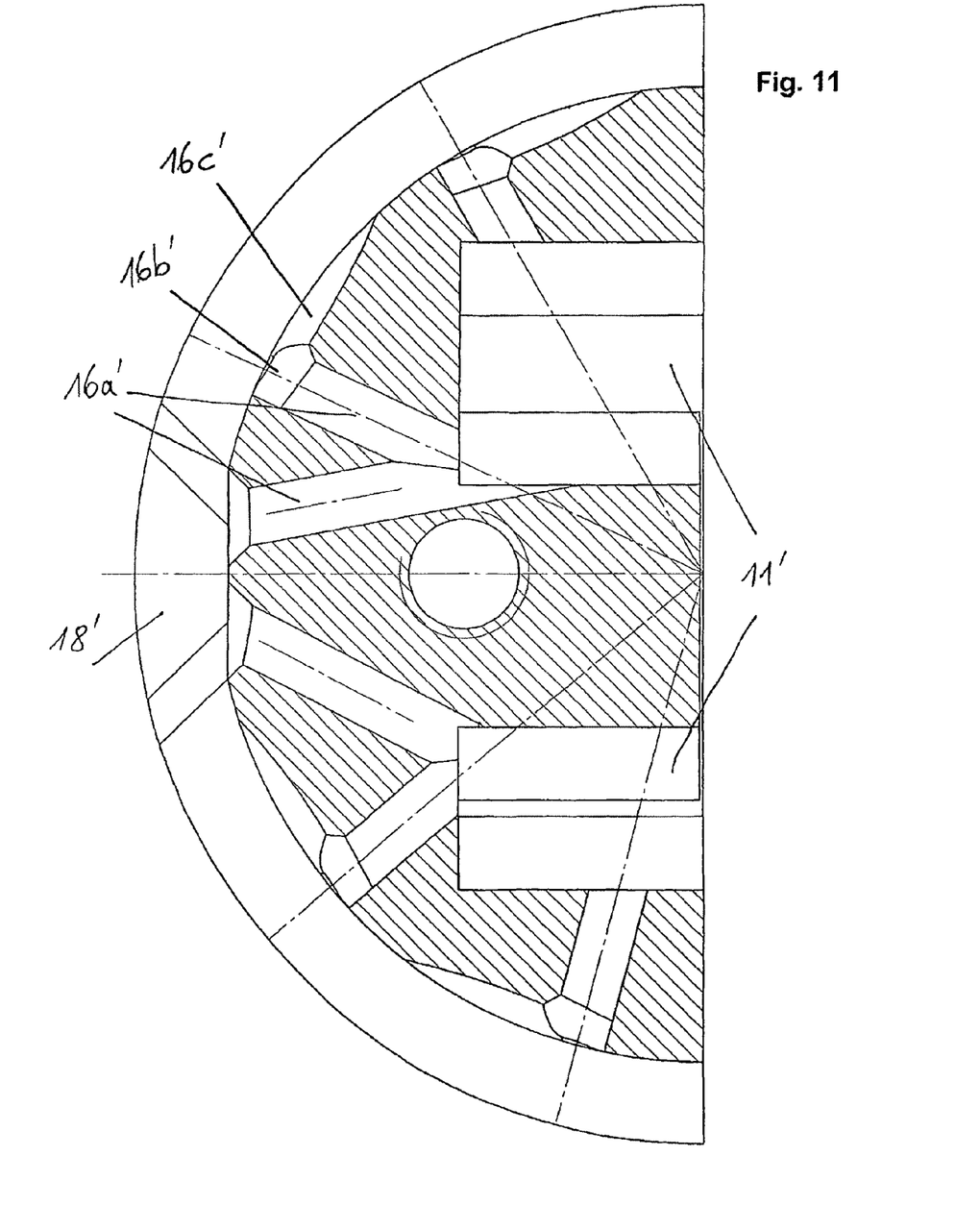
FIG. 11 is a view of a cross section of the impregnation tool of FIG. 9.

FIG. 11 is a cross-sectional view of the impregnation tool 10' in accordance with the second exemplary embodiment. The distribution of the recesses 16' and the orientation of the recesses can be seen from this view. Furthermore two cavities 11' are represented, which are formed lengthwise almost about the complete length of the impregnation tool 10'. These cavities 11' are provided for the transport of melted polymer material towards the recesses and, subsequently, to the grooves. The first recess sections 16a' are each connected to the cavities 11'. The shape and orientation of the recess sections 16b' and 16c' is identical as the recess sections 16b and 16c formed in accordance with the first exemplary embodiment. A liquefied polymer material can be pressed through the cavities 11' and the recess sections 16k, 16b' and 16c' from below against a roving band to impregnate this band completely, as described above with respect to the first exemplary embodiment.

Figure 12:
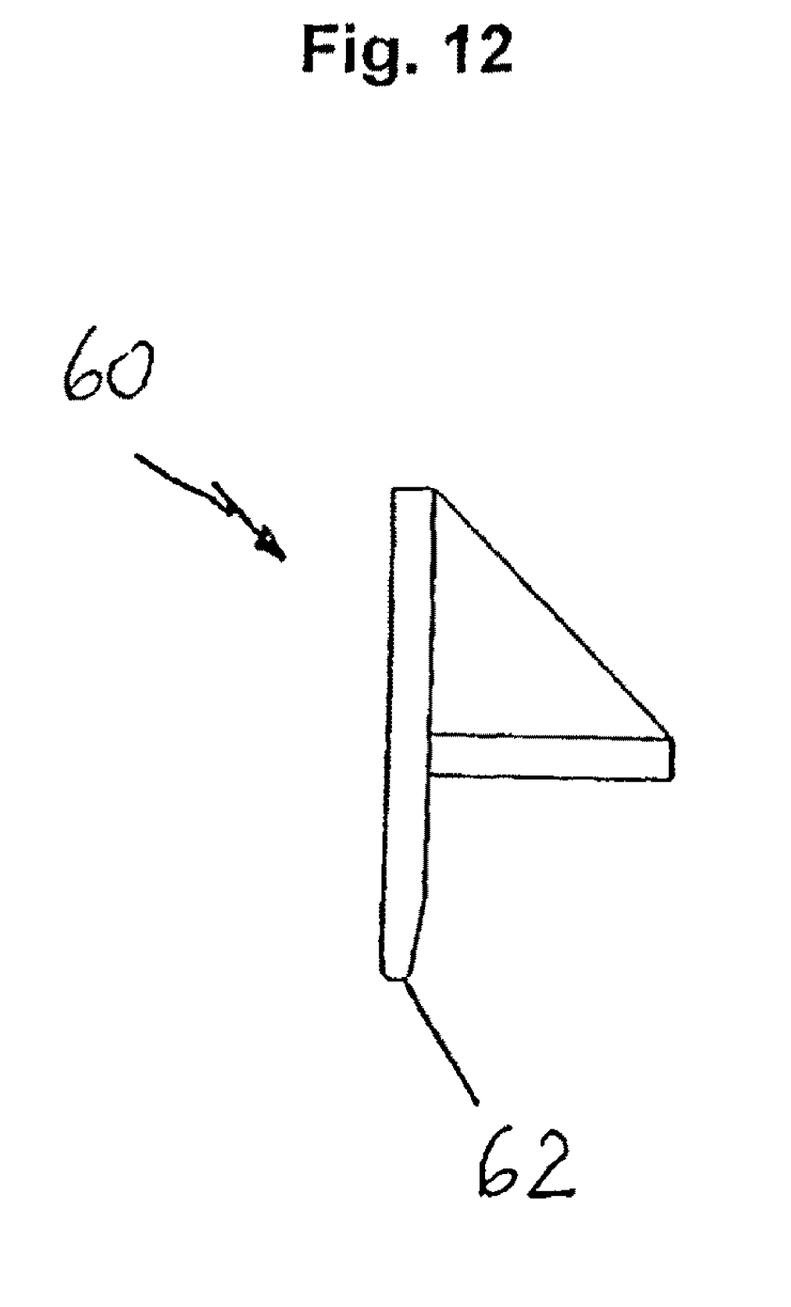
FIG. 12 is a side view of a pressing bar of the impregnation unit according to the second embodiment of the invention.

A pressing bar can be used at the pocket 18', for the improvement of the impregnation. This bar is represented in a side view in FIG. 12. The essential feature of the bar 60 is the lower edge 62. The lower edge 62 has approximately a width of 4 mm. The rims of the edge are rounded. If the pressing bar is pressed from above onto the roving bands, on the one hand, each band is pushed flatly into the respective groove and, on the other hand, surplus polymer material is accumulated. This accumulation makes sure that the bands are enclosed completely from all sides with polymer material. The pressing bar 60 makes sure that an improved impregnation can be achieved.

Figure 13:
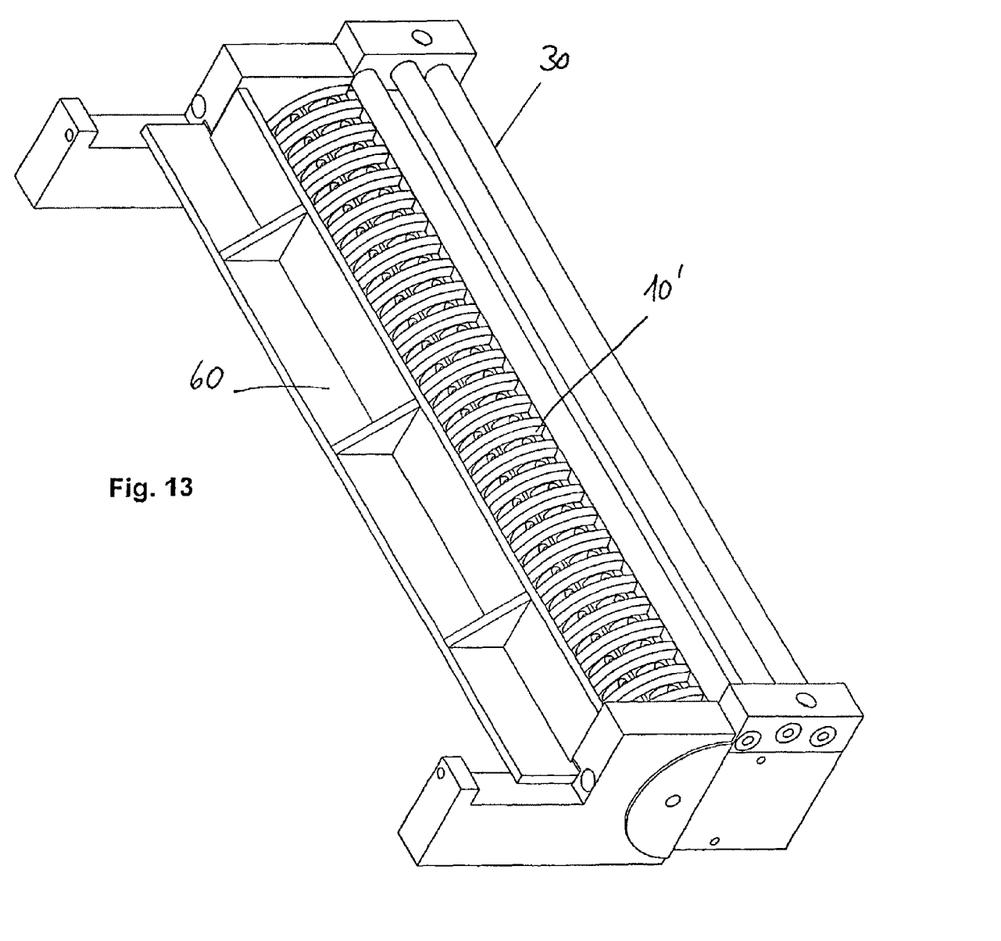
FIG. 13 is a perspective view of the assembled impregnation unit according to the second embodiment of the invention.

An assembly of the impregnation unit in accordance with the second exemplary embodiment is represented in FIG. 13. Bars 30 are represented which provide a splicing of the single filament bundles. The bundles are led through these bars 30 in snake like lines and through the grooves of the impregnation tool 10'. Furthermore the bands are pulled under the pressing bar 60.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

We claim:

1. A device for impregnating filaments wherein the filaments form a roving, comprising:
a barrel having a groove formed in circumferential direction of the barrel, an inner space formed along the centre axis of the barrel, and a recess which forms a connection between the inner space and the groove, wherein the recess includes a cylindrical section, a conical section, and a pocket section that is substantially in the form of a tear drop, so that a polymer material can be pressed successively from the inner space through at least the cylindrical section and the conical section into the groove to impregnate the filaments of the roving if the roving is drawn through the groove.

2. The device of claim 1, wherein the pocket section of the recess extends at the bottom surface of the groove from the conical section of the recess in circumferential direction of the barrel.

3. The device according to claim 1, wherein the barrel comprises a row of twelve grooves side by side along the axis of the barrel.

4. The device of claim 3, wherein the inner space is a cylindrical axial through hole.

5. The device according to claim 1, wherein the barrel comprises a row of twenty-eight grooves side by side along the axis of the barrel.

6. The device of claim 5, wherein the inner space includes two separate canals each of which is formed along the axis of the barrel in the portion of the row of grooves.

7. The device according to claim 1, wherein the inner space is connected with an extruder pre-processing the polymer used to impregnate the filaments of the roving.

8. The device according to claim 1, further comprising a comb to lead the roving into the at least one groove.

9. The device according to claim 1, further comprising several pins to splice the roving before the roving is led into the at least one groove.

10. The device according to claim 1, further comprising a pressing bar to press the roving onto the bottom surface of the at least one groove.

11. The device according to claim 1, further comprising a polygon which is located parallel to the barrel and above which the roving is drawn.

12. A device for impregnating filaments wherein the filaments form a roving, comprising:
a barrel having a groove formed in circumferential direction of the barrel, an inner space formed along the centre axis of the barrel, and a recess which forms a connection between the inner space and the groove, wherein the recess includes a cylindrical section, a conical section, and a pocket section, so that a polymer material can be pressed successively from the inner space through at least the cylindrical section and the conical section into the groove to impregnate the filaments of the roving if the roving is drawn through the groove, and a pressing bar for pressing the roving onto the bottom surface of the at least one groove.

13. The device according to claim 12, wherein the inner space is connected with an extruder pre-processing the polymer used to impregnate the filaments of the roving.

14. The device according to claim 12, further comprising a comb to lead the roving into the at least one groove.

15. The device according to claim 12, further comprising several pins to splice the roving before the roving is led into the at least one groove.

16. The device according to claim 12, further comprising a polygon which is located parallel to the barrel and above which the roving is drawn.

17. The device of claim 12, wherein the pocket section of the recess extends at the bottom surface of the groove from the conical section of the recess in circumferential direction of the barrel.

18. The device of claim 12, wherein the inner space is a cylindrical axial through hole.

19. The device of claim 12, wherein the inner space includes two separate canals each of which is formed along the axis of the barrel in the portion of a row of grooves.

20. A device for impregnating filaments wherein the filaments form a roving, comprising:
a barrel having a groove formed in circumferential direction of the barrel, an inner space formed along the centre axis of the barrel, and a recess which forms a connection between the inner space and the groove, wherein the recess includes a cylindrical section, a conical section, and a pocket section, so that a polymer material can be pressed successively from the inner space through at least the cylindrical section and the conical section into the groove to impregnate the filaments of the roving if the roving is drawn through the groove, and a comb to lead the roving into the at least one groove.

* * * * *